March 26, 1946.  E. WIEDMANN  2,397,395
HYDRAULIC TRANSMISSION
Filed Dec. 21, 1942  2 Sheets-Sheet 1
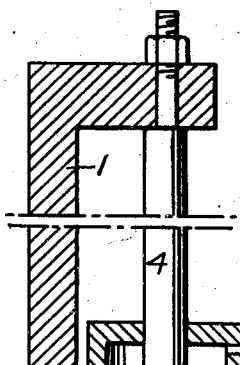
Fig. 1.
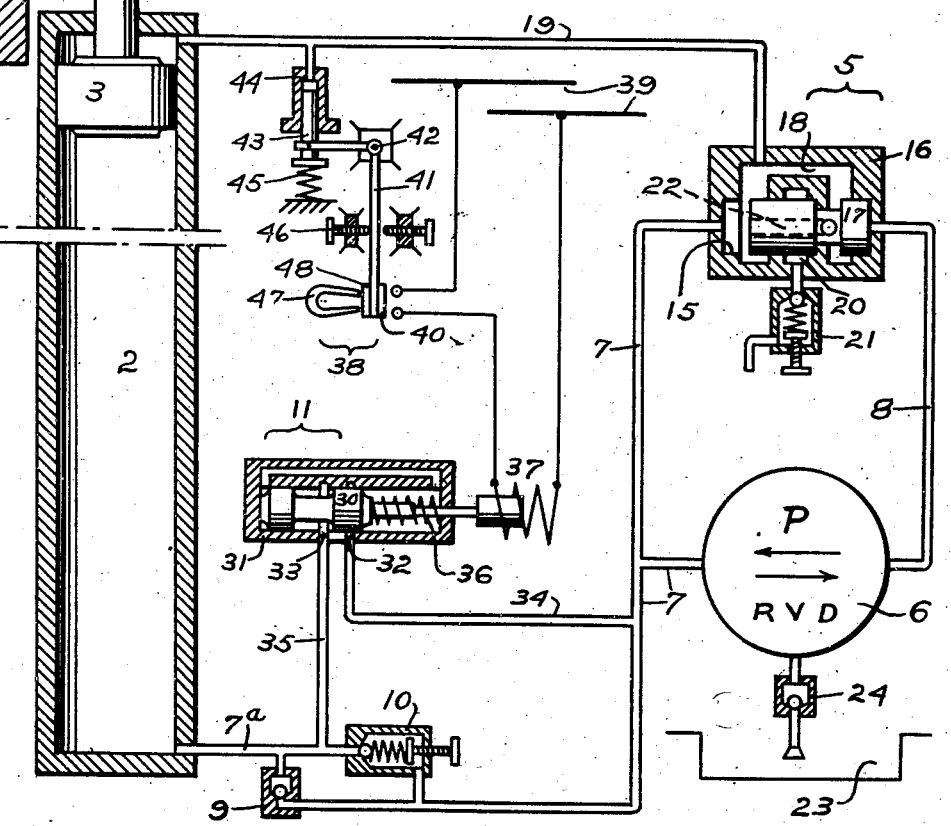
Fig. 2.
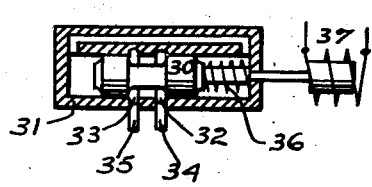
Fig. 3.
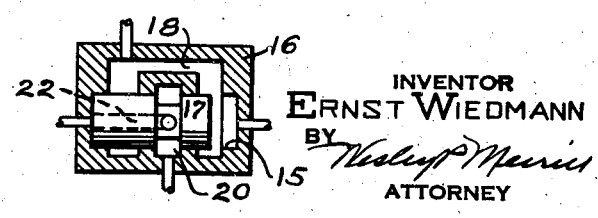
INVENTOR
ERNST WIEDMANN
BY
ATTORNEY

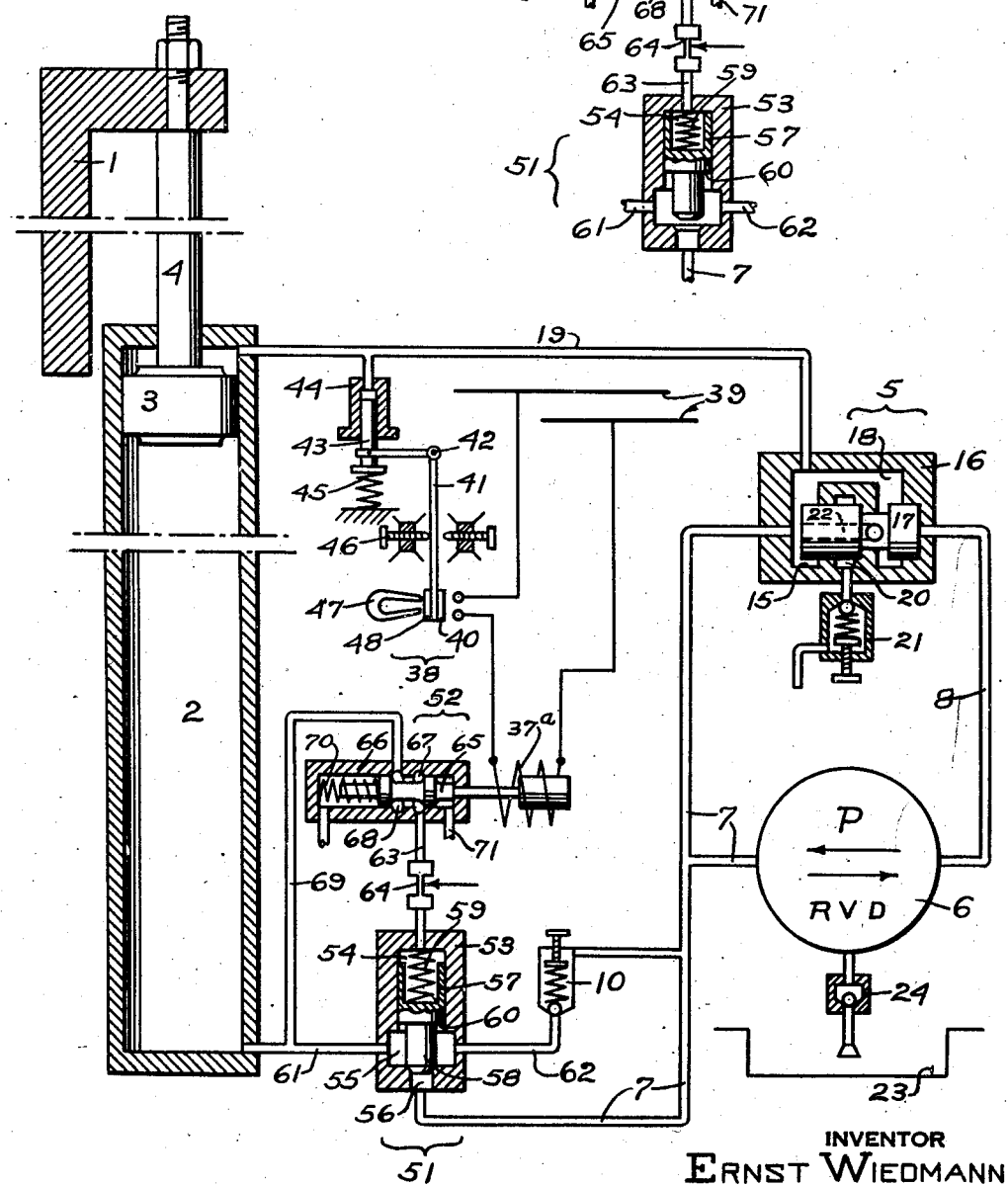

Patented Mar. 26, 1946

2,397,395

UNITED STATES PATENT OFFICE 2,397,395

HYDRAULIC TRANSMISSION

Ernst Wiedmann, Summit, Wis., assignor to The Oilgear Company, Milwaukee, Wis., a corporation of Wisconsin Application December 21, 1942, Serial No. 469,681

6 Claims. (Cl. 60—52)

This invention relates primarily to hydraulic transmissions the motors of which should have a back pressure maintained thereon during a part of a cycle of operations and it relates in particular to hydraulic transmissions the motors of which are continuously loaded such for example as a hydraulic transmission employed to reciprocate a vertically movable machine element the weight of which is normally supported by the motor of the transmission.

For the purpose of illustration, the invention will be explained as applied to a broaching machine having a vertically reciprocable tool slide but it is to be understood that the invention is not limited to such use.

The invention has as an object to provide a hydraulic transmission having means to impose a back pressure upon the motor thereof and means to remove or reduce the back pressure in response to a predetermined increase in the motor load.

Another object is to reduce the back pressure upon a motor in response to a predetermined increase in motor load and to prevent the back pressure from being increased until after the motor load has been reduced to a value considerably lower than the value at which the back pressure was reduced.

Other objects and advantages will appear from the description hereinafter given of hydraulic transmissions in which the invention is embodied.

According to the invention in its general aspect and as ordinarily embodied in practice, the discharge of liquid from the motor is resisted by one or more resistance valves and at least one of those valves is rendered ineffective in response to the motor load increasing to a given value with a resultant increase in pump pressure. Also, the ineffective resistance valve is prevented from becoming effective until after the motor load has been reduced to a value considerably lower than the value at which the back pressure was reduced.

The invention is exemplified by the transmissions shown schematically in the accompanying drawings in which the views are as follows:

Fig. 1 is a circuit diagram showing an embodiment of the invention employed to drive the tool slide of a vertical broaching machine.

Fig. 2 is a view showing a bypass valve in a position different from that shown in Fig. 1.

Fig. 3 is a view showing a differential valve in a position different from that shown in Fig. 1.

Fig. 4 is a view similar to Fig. 1 but showing a different type of bypass valve.

Fig. 5 is a view showing the bypass and pilot valves in positions different from those shown in Fig. 4.

FIGS. 1–3

Since the broaching machine forms no part of the present invention, only the tool slide 1 thereof has been shown. Slide 1 is adapted to be reciprocated by a hydraulic motor having its cylinder 2 arranged in a stationary position and its piston 3 fitted in cylinder 2 and connected to slide 1 by a rod 4.

In order that slide 1 may be moved downward at a suitable cutting speed and then moved upward at high speed, motive liquid is first directed to the upper end of cylinder 2 at a predetermined rate and then delivered to both ends of cylinder 2 through a differential valve 5 from a pump 6 which has been shown as being of the reversible variable delivery type. Pump 6 is adapted to deliver liquid into either of two channels 7 and 8 which are connected to opposite ends of valve 5.

Channel 7 is also connected through a check valve 9 and resistance valve 10, which are connected in parallel and open in opposite directions, and a channel 7ª to the lower end of cylinder 2. Check valve 9 permits liquid to flow freely from pump 6 to the lower end of cylinder 2 but it prevents liquid from escaping from the lower end of cylinder 2 except through resistance valve 10 or through a bypass valve 11 to be presently described.

Channels 7 and 8 communicate with opposite ends of a bore 15 which is formed in the casing 16 of differential valve 5 and has a pressure responsive plunger 17 fitted therein. Bore 15 communicates, at points spaced from both ends thereof, with a U-shaped chamber 18 which is connected by a channel 19 to the upper end of cylinder 2. Intermediate the ends of chamber 18 and separated therefrom by a suitable partition is an annular groove or port 20 which communicates with a low pressure resistance valve 21. A passage 22, which extends inward from the left end of plunger 17 and then radially outward through a reduced portion thereof, provides communication between channel 7 and resistance valve 21 when valve plunger 17 is in the position shown in Fig. 3 so that the liquid discharged from the lower end of cylinder 2 in excess of the volume required by pump 6 may flow through passage 22 into port 20 and be discharged therefrom through resistance valve 21. When valve plunger 17 is in the position shown in Fig. 1, the liquid discharged from the upper end of cylinder 2 is directed to the lower end thereof at which time pump 6 draws its supply of liquid from a reservoir 23 through a check valve 24.

Bypass valve 11 includes a plunger 30 which is fitted in a valve casing 31 to control communication between two ports 32 and 33 which are connected by channels 34 and 35 to channel 7 and 7ª respectively. Plunger 30 is urged by a spring 36 to its closed position and it is adapted to be moved by a solenoid 37 to its open position.

Solenoid 37 may be controlled by any suitable pressure responsive switch operated by a piston and cylinder of the well known type in which the piston has a small area exposed to pressure at all times and a larger area exposed to pressure only after the piston has been moved a given distance by high pressure. For the purpose of illustration however, solenoid 37 has been shown as being controlled by a switch 38 which is connected between one side of a power line 39 and one end of the winding of solenoid 37 the other end of which is connected to the other side of power line 39.

Switch 38 has its movable contact 40 carried by one arm of a bell crank lever 41 which is pivoted upon a stationary pin 42. The other arm of lever 41 is pivoted to a piston 43 fitted in a stationary cylinder 44 which is connected to channel 19 so that the end of piston 43 is constantly exposed to the pressure in channel 19. Piston 43 is urged into cylinder 44 by a light spring 45 which also normally holds switch 38 open and lever 41 against an adjusting screw 46. Switch 38 is also held open by a permanent magnet 47 the armature 48 of which is carried by lever 41.

The arrangement is such that switch 38 will remain open until the pressure in channel 19 becomes high enough to exert sufficient force upon piston 43 to enable it to overcome the resistance of spring 45 and the attraction of magnet 47 and then piston 43 will swing lever 41 upon pin 42 to close switch 38. After switch 38 is closed, substantially the only force tending to open it is the force exerted by spring 45 since the armature 48 has been moved out of the effective magnetic field so that the pull of magnet 47 upon armature 48 may be disregarded. Consequently, switch 38 may be opened in response to the pressure in channel 19 reaching a given high value and it will remain open until the pressure in channel 19 has dropped to a considerably lower value.

Operation

With the parts in the position shown in Fig. 1 and pump 6 running at zero displacement, piston 3 is being supported by the liquid trapped in cylinder 2 by resistance valve 10 which has a resistance at least as great as that required to support piston 3 and the load carried thereby.

When pump 6 is adjusted to discharge liquid into channel 8, the liquid will first move plunger 17 of valve 5 from the position shown in Fig. 1 to the position shown in Fig. 3 and then it will flow through bore 15, chamber 18 and channel 19 to the upper end of cylinder 2 and cause piston 3 to move slide 1 downward and enable a broaching tool (not shown) carried by slide 1 to take a cut from work (not shown).

Piston 3 in moving downward will eject liquid from the lower end of cylinder 2 through channel 7ª, resistance valve 10 and channel 7 to the intake of pump 6. Due to the displacement of rod 4, liquid is expelled from the lower end of cylinder 2 at a rate in excess of pump requirements, and the excess liquid flows through channel 7, passage 22 and port 20 and is exhausted through resistance valve 21 which causes pressure to be created in channel 7 so that pump 6 is supercharged with liquid at a pressure proportional to the resistance of resistance valve 21.

Downward movement of piston 3 is at first resisted by the combined resistances of resistance valves 10 and 21 which maintain a predetermined back pressure on piston 3. After the tool engages the work, downward movement of piston 3 is restricted by both the back pressure and the tool resistance.

It is well known that a back pressure must be maintained upon a motor piston employed to drive a tool taking a cut which varies in thickness due to irregularities in the surface or to variations in the hardness of the work being machined as otherwise the rate of tool movement would vary excessively due to variations in tool resistance.

If work having an irregular surface is machined by a tool having a plurality of cutting faces or teeth arranged in series, such as a broaching tool, the first few teeth take cuts of varying thickness and the resultant variations in tool resistance tends to cause the tool to move at an irregular rate but the succeeding teeth take cuts of uniform thickness and the resistance encountered by the succeeding teeth overcomes to a large extent the tendency of the tool to move at an irregular rate due to the variations in resistances met by the first few teeth.

In the present invention, a relatively high back pressure is imposed upon piston 3 by resistance valves 10 and 21 while only a few teeth at the leading end of the broach are operating upon the work and this back pressure is maintained until enough of the succeeding teeth are operating upon the work to prevent the variations in the resistances to the leading teeth from causing material variations in the rate of tool movement at which time the load on piston 3 will have increased sufficiently to cause pump pressure to rise high enough to enable the liquid in cylinder 44 to exert sufficient force upon piston 43 to overcome the resistance of spring 45 and the pull of magnet 47 so that piston 43 can swing lever 41 upon pin 42 and close switch 38.

Closing switch 38 causes solenoid 37 to be energized and to shift valve plunger 30 from the position shown in Fig. 1 to the position shown in Fig. 2. Then the liquid ejected from cylinder 2 by piston 3 flows through channels 7ª and 35, valve 11 and channel 34 into channel 7 from which a part of the liquid enters pump 6 and the remainder flows through passage 22 into port 20 and is discharged through resistance valve 21 which maintains a low pressure in channel 7 so that pump 6 is supercharged at a low pressure and a low back pressure is maintained upon piston 3.

Shifting bypass valve plunger 30 reduces the load on piston 3 and thereby causes the pressure in channel 19 to be reduced an amount proportional to the resistance of resistance valve 10 but switch 38 cannot open as magnet 47 at this time exerts little if any pull upon armature 48 and spring 45 is not strong enough to raise piston 43 against the pressure prevailing in channel 19.

Switch 38 remains closed and piston 3 continues downward until the load on piston 3 drops to a low value, such as when only the last few teeth of the broach are operating upon the work, and then the pressure in channel 19 drops enough to permit spring 45 to raise piston 43 and open switch 38, thereby deenergizing solenoid 37 and permitting spring 36 to shift valve plunger 30 back to the position shown in Fig. 1.

At the end of the down stroke, pump 6 is reversed in any suitable manner to cause liquid therefrom to flow through channel 7, check valve 9, and channel 7ª to the lower end of cylinder 2 and raise piston 3 the resistance of which causes pressure to rise and shift valve plunger 17 of differential valve 5 to the position shown in Fig. 1. The liquid ejected from the upper end of cylinder 2 by piston 3 flows through channel 19, differential valve 5, channel 7, check valve 9 and channel 7ª to the lower end of cylinder 2 so that pump 6, which at this time draws its supply of liquid from reservoir 23 through check valve 24, need supply only a volume of liquid equal to the displacement of rod 5 and this volume raises piston 5 at high speed to the end of its up stroke at which time the displacement of pump 6 is reduced to zero in any suitable manner.

FIGS. 4 AND 5

The transmission shown in Fig. 4 is exactly the same as the transmission shown in Fig. 1 except for the means employed to bypass resistance valve 10. Consequently, like parts have been indicated by like reference numerals and further description thereof is deemed unnecessary. As shown, the liquid discharged from the lower end of cylinder 2 may be bypassed around resistance valve 10 through a pressure operated valve 51 which is controlled by a pilot valve 52.

Bypass valve 51 includes a casing 53 which has a bore 54, a counterbore 55 and a port 56 formed therein concentric with each other, a piston 57 which is fitted in bore 54, a valve 58 which is fixed to piston 57 and extends across counterbore 55 to control port 56, and a spring 59 which urges valve 58 towards closed position and is arranged in the rear or inner end of bore 54 and in a recess formed in piston 57, valve 58 being smaller in diameter than piston 57 to provide at the junction thereof a pressure area 60.

Port 56 has channel 7 connected thereto, counterbore 55 is connected by a channel 61 to the lower end of cylinder 2 and by a channel 62 to the inlet of resistance valve 10 the outlet of which is connected to channel 7, and the rear or inner end of bore 54 is connected to pilot valve 52 by a channel 63 having a choke 64 arranged therein to limit the rate of flow therethrough and thereby prevent the valve from closing suddenly.

Pilot valve 52 has a plunger 65 arranged in its casing 66 to control communication between a port 67, to which channel 63 is connected, and a port 68 which is connected by a channel 69 to channel 61. Valve plunger 65 is urged by a spring 70 to a position in which ports 67 and 68 are in communication with each other, and it is adapted to be moved by a solenoid 37ª to a position in which port 68 is blocked and port 67 is connected to a drain channel 71. Solenoid 37ª is controlled by a switch 38 which is identical to and functions in the same manner as the switch 38 shown in Fig. 1.

In actual practice, valves 10, 51 and 52 are arranged in a single casing, pilot valve 51 is somewhat different and two chokes are connected between valves 51 and 52 and have different capacities so that valve 51 can open quicker than it can close. However, since the present invention is not dependent upon a particular valve construction, the valves have been shown schematically in order to simplify the view.

Operation

The transmission shown in Fig. 4 will function in the same manner as the transmission shown in Fig. 1 except for the manner in which liquid is bypassed around resistance valve 10.

During the first part of the down stroke of piston 3, the liquid ejected from the lower end of cylinder 2 will flow through channel 61, counterbore 55, channel 62 and resistance valve 10 into channel 7 from which a part of the liquid will flow into pump 6 to supercharge it and the balance of the liquid will flow through differential valve 5 and resistance valve 21 into reservoir 23 as previously explained. The pressure of this liquid will act upon the area 60 of piston 57 and tend to open valve 51 but the same pressure extends through channel 69, pilot valve 52 and channel 63 to the inner end of bore 54 and acts upon the inner end of piston 57 which has a greater effective area than pressure area 60 so that valve 51 is held closed.

When the resistance to the downward movement of piston 3 becomes great enough to cause switch 38 to close as previously explained, solenoid 37ª will be energized and shift pilot valve 65 to the position shown in Fig. 5 so that bore 54 is opened to drain. The pressure acting upon area 60 will then move piston 57 and valve 58 to the position shown in Fig. 5 and permit the liquid ejected from the lower end of cylinder 2 to flow through channel 61, counterbore 55 and port 56 into channel 7, thereby bypassing resistance valve 10 so that the only substantial resistance to the discharge of liquid from cylinder 2 is provided by resistance valve 21. Bypassing resistance valve 10 causes pump pressure to drop but switch 38 will not open until the tool carried by slide 1 has completed or nearly completed its cut at which time pump pressure will drop sufficiently to permit switch 38 to open as previously explained.

Opening switch 38 deenergizes solenoid 37ª and permits spring 70 to shift pilot value plunger 65 to the position shown in Fig. 4 and then any pressure in channel 61 extends through channel 69, pilot valve 52 and channel 63 to bore 54 and assists spring 59 to close valve 51.

When the pump 6 is reversed, the pressure created in channel 7 will shift plunger 17 of differential valve 5 to the position shown in Fig. 4 and it will act upon the end of valve 58 and raise it. Then the liquid discharged by pump 6 will flow through channel 7, port 56, counterbore 55 and channel 61 to the lower end of cylinder 2 and raise piston 3, and the liquid ejected by piston 3 from the upper end of cylinder 2 will flow through channel 19 and differential valve 5 into channel 7 so that piston 3 is raised at high speed as previously explained.

The transmission described herein is susceptible of various modifications and adaptations without departing from the scope of the invention which is hereby claimed as follows:

1. In a hydraulic transmission having a hydraulic motor, a pump for delivering motive liquid to said motor to energize the same and a resistance normally effective to resist the discharge of liquid from said motor to thereby impose a back pressure upon said motor, the combination of electrically operated means adapted when operated to render said resistance ineffective, a switch adapted when closed to effect operation of said electrically operated means, means operated by pump pressure for closing said switch, and a magnet constantly urging said switch to open position and so located that a high pump pressure is required to enable said pressure operated means to overcome the pull of said magnet and close said switch and a much lower pump pressure is sufficient to enable said pressure operated means to hold said switch closed.

2. In a hydraulic transmission having a hydraulic motor, a pump for delivering motive liquid to said motor to energize the same and a resistance normally effective to resist the discharge of liquid from said motor to thereby impose a back pressure upon said motor, the combination of electrically operated means adapted when operated to render said resistance ineffective, a switch having a stationary contact and a movable contact adapted when closed upon said stationary contact to effect operation of said electrically operated means, means operated by pump pressure for closing said movable contact upon said stationary contact, a magnet constantly urging said movable contact to open position and so located that a high pump pressure is required to enable said pressure operated means to overcome th pull of said magnet and close said switch and a much lower pump pressure is sufficient to enable said pressure operated means to hold said switch closed, and means for adjusting the initial position of said movable contact relative to said magnet to thereby cause said switch to be operated at different pressures.

3. In a hydraulic transmission having a hydraulic motor, a pump for delivering motive liquid to said motor to energize the same and a resistance normally effective to resist the discharge of liquid from said motor to thereby impose a back pressure upon said motor, the combination of a normally closed bypass valve for bypassing liquid around said resistance, a solenoid for operating said bypass valve, a switch adapted when closed to cause said solenoid to be energized and open said bypass valve, means operated by pump pressure for closing said switch, and a magnet constantly urging said switch to open position and so located that a high pump pressure is required to enable said pressure operated means to overcome the pull of said magnet and close said switch and a much lower pump pressure is sufficient to enable said pressure operated means to hold said switch closed.

4. In a hydraulic transmission having a hydraulic motor and a pump for delivering motive liquid to said motor to energize the same, the combination of a resistance normally effective to resist the discharge of liquid from said motor to thereby impose a back pressure upon said motor, a normally closed pressure responsive valve for bypassing liquid around said resistance, a second valve for controlling said pressure responsive valve, a solenoid for operating said second valve to thereby cause said pressure responsive valve to open, a switch adapted when closed to cause said solenoid to be energized, and means responsive to pump pressure reaching a given high value for closing said switch and for keeping it closed until pump pressure has been reduced to a considerably lower value.

5. In a hydraulic transmission comprising a cylinder having a first port and a second port, a piston fitted in said cylinder and forming therewith a hydraulic motor, a pump for supplying liquid to said motor to energize the same and fluid channels connecting said pump to said ports and providing substantially free flow of liquid to and from said first port and including a resistance for resisting the discharge of liquid from said second port, the combination of a check valve connected in parallel with said resistance to enable said pump to deliver liquid to said second port, said check valve being normally closed to prevent the discharge of liquid from said second port except through said resistance and being adapted when open to bypass liquid freely around said resistance, a servo-motor having a piston connected to said check valve and provided with pressure surfaces of unequal areas the smaller of which is constantly subjected to the pressure at said second port, a second valve normally connecting the larger of said areas to said second port so that the pressure therein acts upon said larger area and enables said piston to hold said check valve closed, said second valve being adapted when shifted to connect said larger area to exhaust to thereby enable the pressure acting upon said smaller area to open said check valve, and means responsive to the pressure at said first port reaching a given high value for shifting said second valve and for keeping it shifted until the pressure at said first port has dropped to a considerably lower value.

6. In a hydraulic transmission comprising a cylinder having a first port and a second port, a piston fitted in said cylinder and forming therewith a hydraulic motor, a pump for supplying liquid to said motor to energize the same and fluid channels connecting said pump to said ports and providing substantially free flow of liquid to and from said first port and including a resistance for resisting the discharge of liquid from said second port, the combination of a check valve connected in parallel with said resistance to enable said pump to deliver liquid to said second port, said check valve being normally closed to prevent the discharge of liquid from said second port except through said resistance and being adapted when open to bypass liquid freely around said resistance, a servo-motor having a piston connected to said check valve and provided with pressure surfaces of unequal areas the smaller of which is constantly subjected to the pressure at said second port, a second valve normally connecting the larger of said areas to said second port so that the pressure therein acts upon said larger area and enables said piston to hold said check valve closed, said second valve being adapted when shifted to connect said larger area to exhaust to thereby enable the pressure acting upon said smaller area to open said check valve, a solenoid for shifting said second valve, a switch adapted when closed to cause said solenoid to be energized, and means responsive to pump pressure reaching a given high value for closing said switch and for keeping it closed until pump pressure has been reduced to a considerably lower value.

ERNST WIEDMANN.